United States Patent [19]
Tabata

[11] Patent Number: 5,431,580
[45] Date of Patent: Jul. 11, 1995

[54] CONNECTOR

[75] Inventor: Masaaki Tabata, Yokkaichi, Japan

[73] Assignee: Sumitomo Wiring Systems, Ltd., Japan

[21] Appl. No.: 219,502

[22] Filed: Mar. 30, 1994

[30] Foreign Application Priority Data

Apr. 7, 1993 [JP] Japan .................................. 5-106200

[51] Int. Cl.⁶ ............................................. H01R 13/28
[52] U.S. Cl. .................................... 439/289; 439/314; 439/310
[58] Field of Search ............... 439/362, 364, 310, 311, 439/289, 314

[56] References Cited

U.S. PATENT DOCUMENTS

| | | | |
|---|---|---|---|
| 1,742,850 | 1/1930 | Douglas | 439/314 OR |
| 1,862,097 | 6/1932 | Riemenschneider | 439/314 X |
| 3,124,404 | 3/1964 | Chesnov | 439/310 X |
| 3,701,965 | 10/1972 | DuRocher et al. | 439/311 X |
| 4,429,938 | 2/1984 | Flor | 439/314 OR |

FOREIGN PATENT DOCUMENTS 124774 11/1992 Japan .
334908 11/1992 Japan .

*Primary Examiner*—Larry I. Schwartz
*Assistant Examiner*—Daniel Wittels
*Attorney, Agent, or Firm*—Jordan B. Bierman; Bierman and Muserlian

[57] ABSTRACT

A connector is provided which can positively conduct a current between two electrodes upon coupling two connector housings and inhibit conduction between the electrodes upon incomplete coupling. The connector includes a stationary side connector housing 1 having stationary side electrodes 4. The housing 1 is provided on an inner peripheral face of a cavity 3 with guide grooves 9 and on a front end face with engaging projections 10. The connector also includes an insertion side connector housing 2 comprising a body block 14 having insertion side electrodes 17, a stationary plate 16 secured to the body block 14 and having intermediate electrodes 23, a movable member 15 having movable electrodes 20 and ribs 21, and locking pipes 22 on an outer peripheral face. Upon a coupling position of a locking mechanism in which the locking pieces 22 are fitted to the engaging projections 10, the movable electrodes 20 move to a position between the insertion side electrodes 17 and the intermediate electrodes 23 so that the insertion side electrodes 17 are electrically coupled to the stationary side electrodes 4. Upon detachment, the insertion side electrodes 17 are electrically disconnected from the stationary side electrodes 4.

8 Claims, 7 Drawing Sheets

CONNECTOR

BACKGROUND OF THE INVENTION

1. Field of the Invention

This invention relates to a connector which brings connector housings into a coupling position to thereby maintain electrical conduction between electrodes.

2. Statement of the Prior Art

For example, in electric automobiles which have been developed recently, it is necessary to frequently charge a battery. In such a case, connection and disconnection between the battery and a charger are effected by way of a connector. Such a connector couples a pair of connector housings to press-contact two pairs of electrodes provided in the connector housings, thereby bringing the electrodes into a state of electrical conduction. In order to lock both connector housings in a coupling position, some connectors are provided with locking means between the connector housings.

In a conventional connector, pairs of electrodes are brought into a conductive state while being coupled (so-called incomplete coupling position) upon coupling the connector housing. Similarly, the pairs of electrodes are brought into a conductive state while being moved to a detaching position upon detaching the connector housings. Consequently, charging can be continued even in an incomplete coupling position caused in the case of mislocking or unlocking upon coupling the connector housings.

Since the connector housings are inclined to be released relatively easily in the incomplete coupling position, the connector housings under conduction of the electrodes may be disconnected on account of their own weight or an external tensile force. At that time, an arc may occur between the electrodes or a short-circuit is generated between the electrodes and another conductive parts.

SUMMARY OF THE INVENTION

An object of the present invention is to provide a connector which can positively bring electrodes into a conductive state in a coupling position of a pair of connector housings and can inhibit the electrodes from conducting in an incomplete coupling position in which the connector housing are relatively easily disconnected.

In order to achieve the above object, a connector housing of the present invention comprises: a stationary side connector housing having stationary side electrodes; an insertion side connector housing having insertion side electrodes; locking means for coupling said insertion side connector housing to said stationary side connector housing so that said insertion side electrodes are electrically coupled to said stationary side electrodes; and movable means disposed between said connector housings to move in association with movement of said locking means and having movable electrodes. The movable electrodes are arranged at a given position between said stationary side and insertion side electrodes to conducts a current between said electrodes upon a coupling position of said locking means and arranged away from said given position to interrupt a conduction between said electrodes upon a detaching position of said locking means.

According to the connector of the present invention, both connector housings are locked in the locking position by coupling the insertion side connector housing to the stationary connector housing and bringing the locking means into the coupling position. At this time, the movable plate provided between both connector housings is moved with the locking means and the movable electrodes moves to a position between the stationary electrodes and the insertion electrodes to effect conduction. On the other hand, when the locking means are in the detaching position, the movable electrodes on the movable plate move to another position so as to prevent conduction. Accordingly, only when both connector housings are locked in the coupling position, are both electrodes brought into a conductive state and when both connector housings are in an incomplete coupling state, both electrodes are brought into a non-conductive state.

Thus, according to the connector of the present invention, since a pair of electrodes are brought into a conductive or non-conductive state in connection with the locking means, the electrodes are positively brought into a conductive state in the coupling position of the connector housing while the electrodes are prevented from conducting when the connector housings are relatively easily detached. Particularly, even if both connector housings happen to be changed from an incomplete to a detaching position, it is possible to prevent any electrical failure such as generation of arc and the like.

DETAILED DESCRIPTION OF THE PREFERRED EMBODIMENTS

Figure 1:
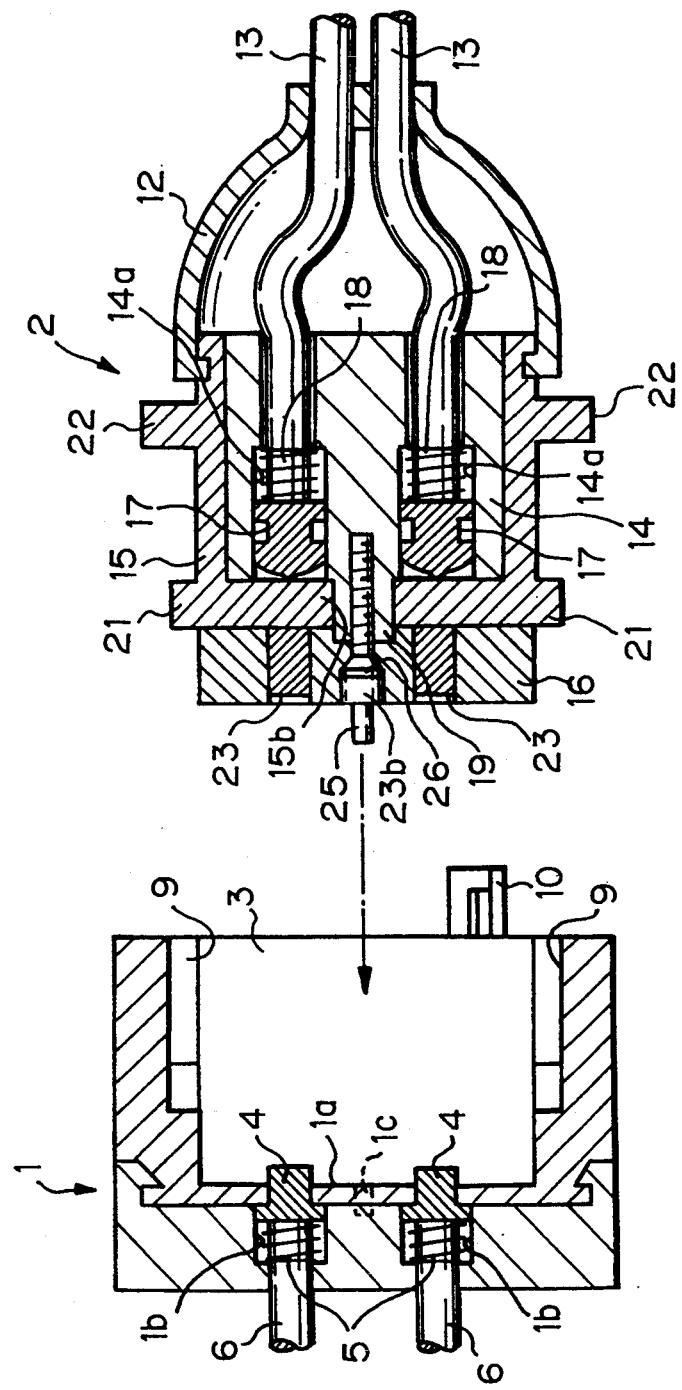
FIG. 1 is a longitudinal sectional view of an embodiment of a connector of the present invention, illustrating a position of the connector prior to being coupled.

Referring now to the drawings, an embodiment of a connector of the present invention will be explained below in the case of a connector to be used for connection of a charger of an electric automobile. FIGS. 1 through 4 show a general construction of an embodiment of a connector. A stationary side connector housing 1 provided on a car body of the electric automobile is shown on the left side in the drawings and an insertion side connector housing 2 provided on a distal end of a cable connected to a charger and adapted to be detachably connected to the stationary side connector housing 1 is shown on the right side.

Firstly, the stationary side connector housing 1 will be explained below. As shown also in FIG. 8, the stationary side connector housing 1 is generally formed into a rectangular block and is provided with a cylindrical recess 3 having an opening at a front end face (a right end face in FIG. 1). The stationary side connector housing 1 is provided on a bottom wall 1a of the recess 3 (a left wall in FIG. 1) with a pair of juxtaposed stationary side electrodes 4 and 4. In this case, the stationary side electrodes 4, 4 are movably accommodated in recesses 1b, 1b in the bottom wall 1a and constrained from moving to a maximum projecting position to the right direction by an enlarged diameter portion at a proximal end. Further, the stationary side electrodes 4, 4 are biased to the right side in the drawings by springs 5, 5 in recesses 1b, 1b to project in the recess 3 normally. Cables 6, 6 connected to the stationary side electrodes 4, 4 respectively are introduced outwardly (left side) from the stationary side connector housing 1.

Figure 4:
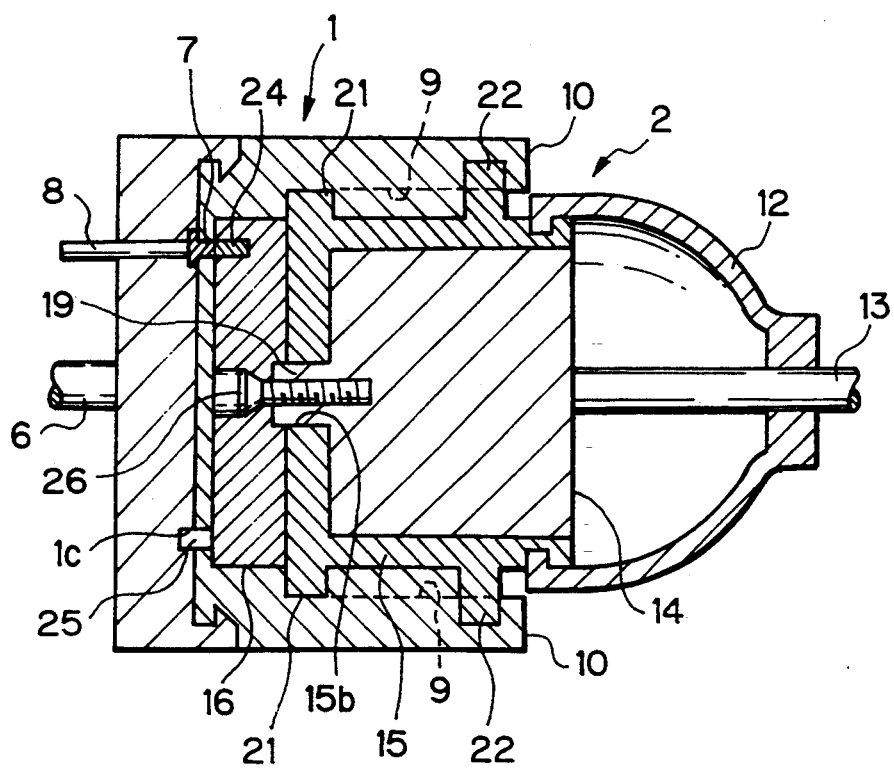
FIG. 4 is a longitudinal sectional view of the connector in the coupled position, taken along lines IV—IV in FIG. 3.

Also, as shown in FIG. 4, three stationary side signal terminals 7 (only one is illustrated in the drawing) are provided on a bottom wall 1a. An end of each leading line 8 is connected to each stationary side signal terminals 7 while the end of the line 8 is drawn out of the connector housing 1. As described hereinafter, the stationary side signal terminal 7 serves to electrically detect whether the insertion side connector housing 2 is connected to the stationary side connector housing 1. The signal terminals 7 contact with insertion side signal terminals provided on the insertion side connector housing 2 respectively upon coupling of the housing 2. In addition, the stationary side connector housing 1 is provided on the bottom wall 1a with a hole 1c to receive a lock pin 25 on the insertion side connector housing 2 mentioned hereinafter.

Figure 8:
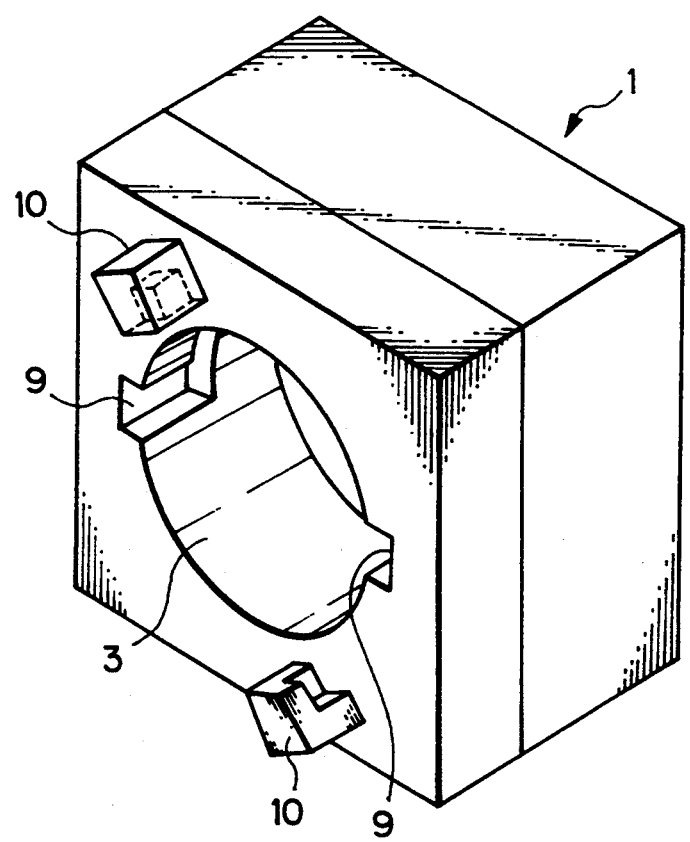
FIG. 8 is a perspective view of a stationary side connector housing taken from a different direction.
Figure 9:
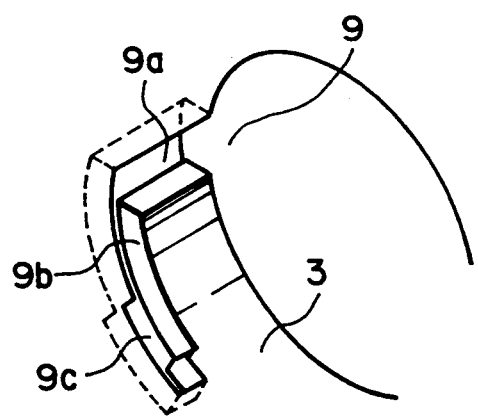
FIG. 9 is a fragmentary enlarged perspective view of a guide groove shown in FIG. 8.

A pair of guide grooves 9, 9 are formed in the inner face of the cavity 3 and arranged symmetrically. As shown in FIG. 9, the guide grooves 9, 9 are formed on the right and left sides at the open end of the cavity 3 and defined by a straight face 9a extending from the open end to an inner part of the cavity, a rotary guide face 9b extending from a proximal end of the straight face 9a to a peripheral position (in a clockwise direction taken from the open end), and a shoulder 9c extending from the rotary guide face 9b to an inner part of the cavity 3 and further extending to a peripheral position. The stationary side connector housing 1 is provided on a front end face (the open end of the cavity 3) diagonally with a pair of engaging projections 10, as shown in FIG. 8. The engaging projections 10 together with lock pieces on the insertion side connector housing 2 mentioned hereinafter constitute a locking mechanism. The engaging projections 10 receive the lock pieces to lock them when the lock pieces rotate in the clockwise direction.

Figure 6:
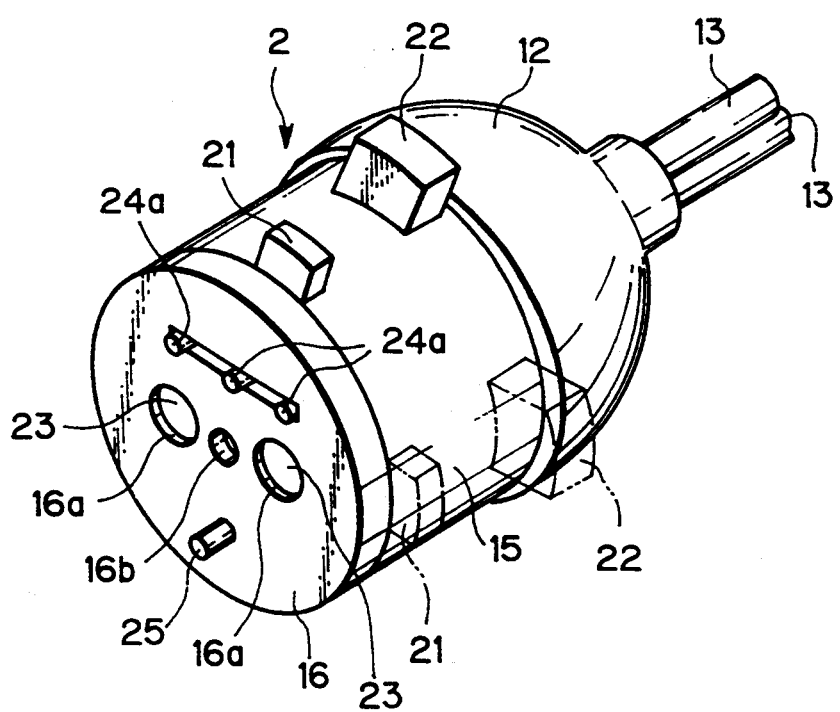
FIG. 6 is a perspective view of an insertion side connector housing of the connector of the present invention.
Figure 7:
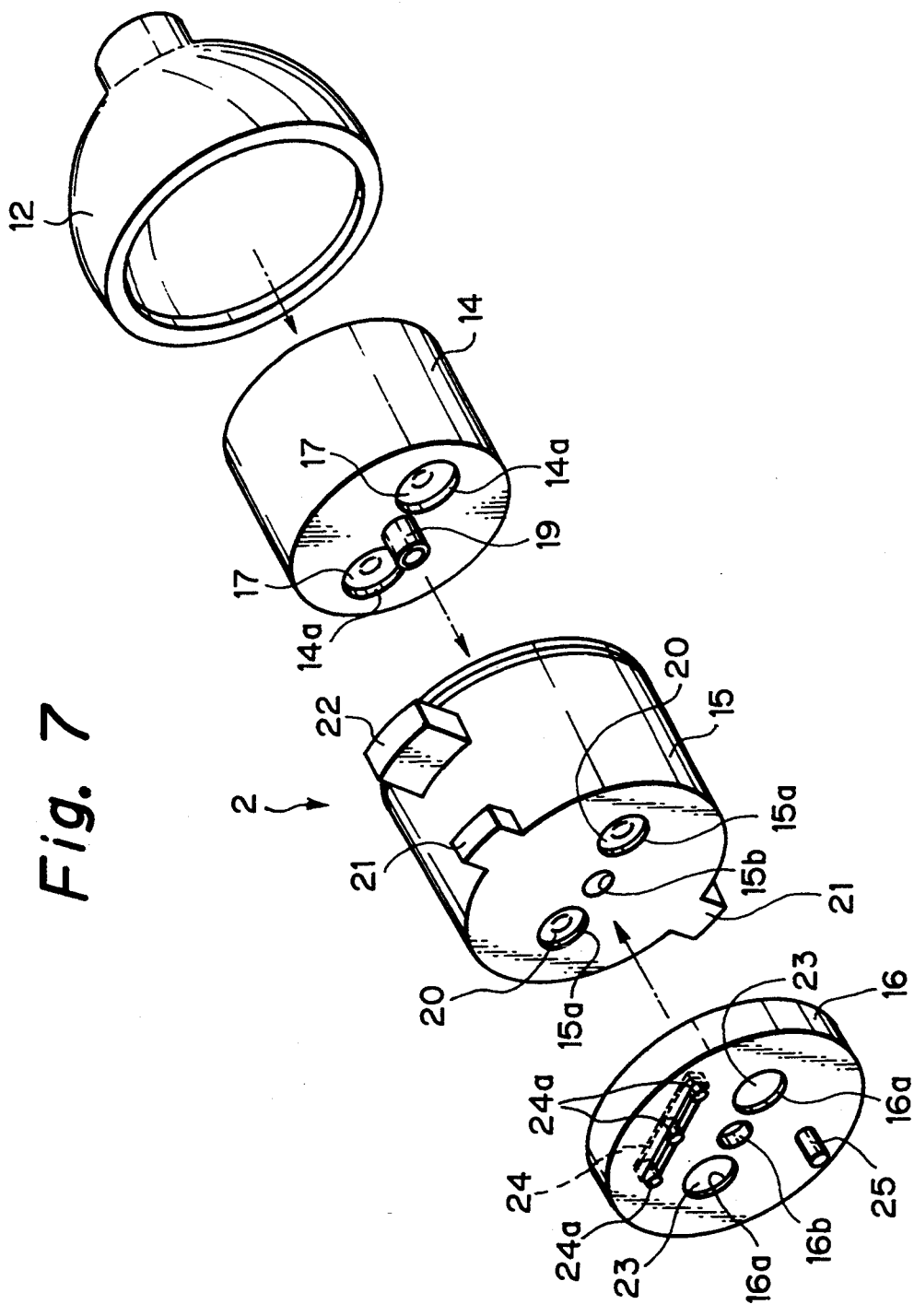
FIG. 7 is an exploded perspective view of the insertion side connector housing shown in FIG. 6.

The insertion side connector housing 2 is constructed in association with the stationary side connector housing 1 mentioned above. As shown in FIGS. 6 and 7, the insertion side connector housing 2 is formed into a cylindrical shape suitable for being received in the cavity 3. A cover 12 is mounted on a proximal end (right end) of the housing 2 while a cable 13 is drawn out of the cover 12 (to a right side).

The insertion side connector housing 2, as shown in FIG. 7, is provided with a both block 14, a movable plate or movable member 15, and a stationary plate 16. As shown in FIG. 7, the body block 14 is formed into a cylindrical shape having a size smaller than that of the housing 2 and provided on an end face with a pair of accommodating recesses 14a, 14a arranged on a diametrical direction.

Figure 2:
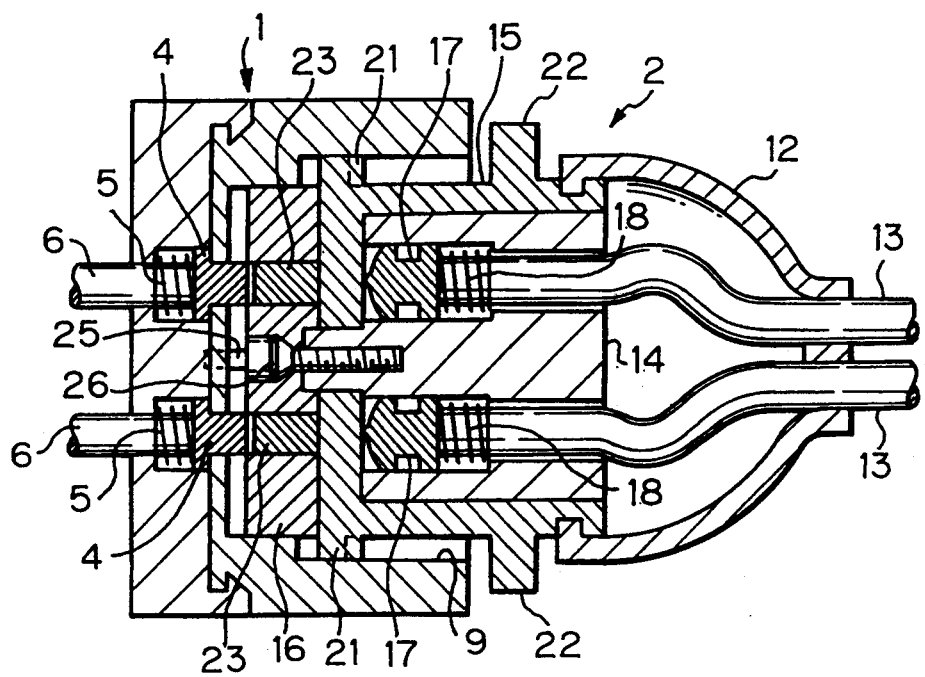
FIG. 2 is a longitudinal sectional view of the connector shown in FIG. 1, illustrating a position of the connector during coupling.
Figure 3:
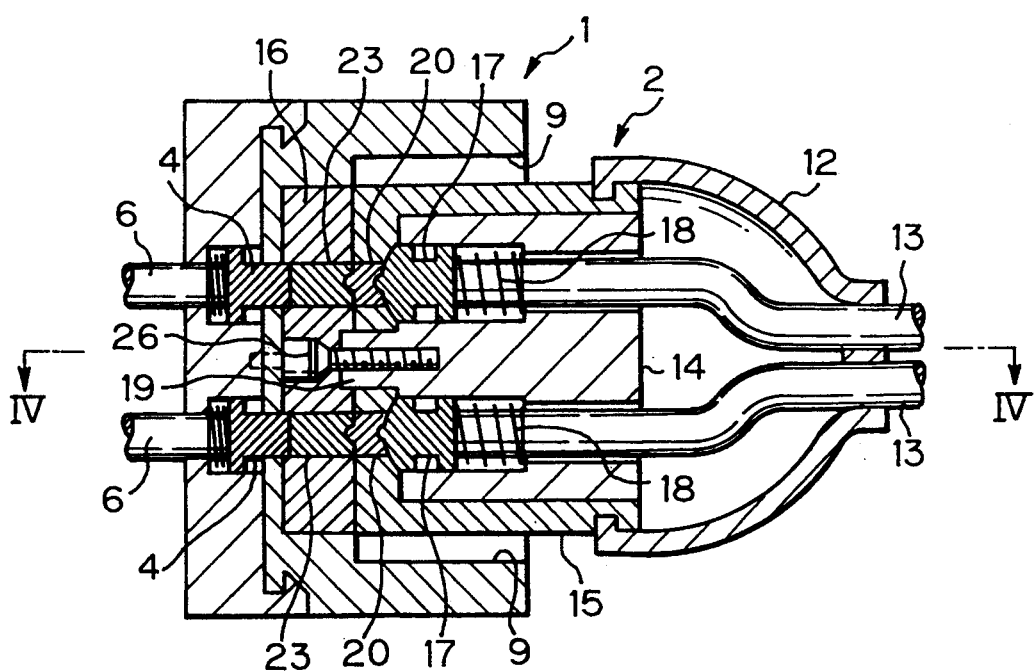
FIG. 3 is a longitudinal sectional view of the connector shown in FIG. 2, illustrating a position of the connector after finishing in coupling.

As shown in FIGS. 1 to 3, the insertion electrodes 17, 17 and springs 18, 18 are accommodated in the recesses 14a, 14a, respectively. Thus, the insertion electrodes 17, 17 are biased outwardly from the end face of the body block 14 by the springs 18, 18. The insertion side electrode 17 is provided on a distal end with a round portion. The cable 13 is connected to the insertion side electrode 17. Further, the body block 14 is provided on a center of the top end with a hub portion 19 having a screwed bore.

On the contrary, the movable member 15 is open at a proximal end face (right end face). The movable member 15 is formed into a cylindrical shape for receiving the body block 14 in the interior. The movable member 15 is provided on the top wall (left end portion) with a pair of through-holes 15a, 15a in opposition to the accommodating recesses 14a, 14a (insertion side electrodes 17, 17). Movable electrodes 20, 20 are accommodated in the through-holes 15a, 15a. The movable electrode 20 is provided on a distal end face with a round projection and on a proximal end face with a round recess.

The movable member 15 is provided on a center of the distal end wall with an aperture 15b through which the hub portion 19 passes. The movable member 15 is also provided diametrically on the distal end on the outer periphery with a pair of ribs 21, 21, as shown in FIGS. 6 and 7 and diametrically on the proximal end on the outer periphery with a pair of lock pieces 22, 22. As shown in FIG. 7, diametrical lines arranging the ribs 21 and lock pieces 22 are greatly inclined with respect to a diametrical line arranging the through-holes 15a, 15a (movable electrodes 20, 20).

The stationary plate 16 is formed into a disc shape corresponding to the distal end face of the movable member 15 and provided with a pair of apertures 16a, 16a corresponding to the recesses 14a, 14a in the body block 14. Intermediate electrodes 23, 23 are accommodated in the apertures 16a, 16a. The stationary plate 16 is provided at a center with a bolt hole 16b.

Figure 5:
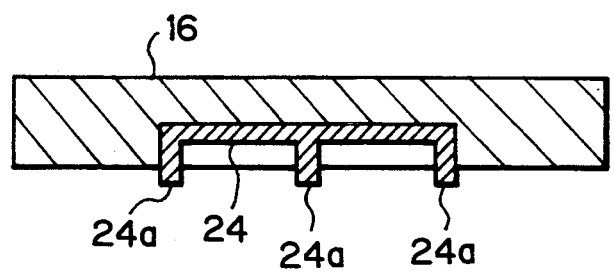
FIG. 5 is a cross sectional view of a fixing plate at an insertion side signal terminal.

The stationary plate 16 is provided on an upper portion with an insertion side signal terminal 24 disposed laterally. As shown in FIG. 5, the insertion side signal terminal 24 has three bosses 24a extending outwardly. Further, the stationary plate 16 is provided on a lower portion with a lock pin 25 extending outwardly as shown in FIGS. 4 and 7.

The insertion side connector housing 2 is constructed by mounting the movable member 15 onto the body block 14 from the left side, mounting the stationary plate 16 on the top end face of the movable member 15, inserting a bolt 26 (see FIGS. 1 to 4) into the bolt hole 16b in the stationary plate 16, and fastening the bolt 26 into the hub portion 19 of the body block 14. Thus, the stationary plate 16 is secured to the body block 14 while the movable member 15 rotatably mounts on the outer periphery of the body block 14.

When the ribs 21 and lock pieces 22 of the movable member 15 are arranged in upper and lower inclined positions shown by full lines in FIG. 6, the insulation side electrodes 17, movable electrodes 20, and intermediate electrodes 23 are aligned to conduct them as shown in FIG. 3. When the movable electrodes 20 are turned to another position on the body block 14, the movable electrodes 20 are displaced from the confronting position of the insertion side electrodes 17 and intermediate electrodes 23 to electrically disconnect them. The cover 12 mounts on an outer periphery of the proximal end of the movable member 15.

Figure 10A:
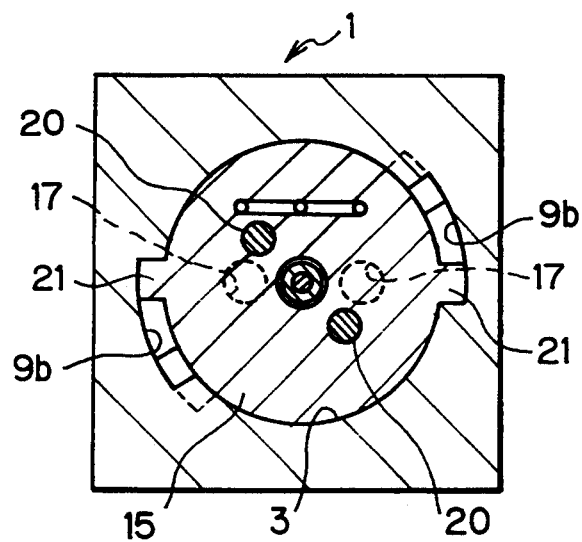
FIGS. 10A, 10B and 10C are cross sectional views illustrating the respective relative positions between movable electrodes and insertion side electrodes upon coupling both connector housings.
Figure 10B:
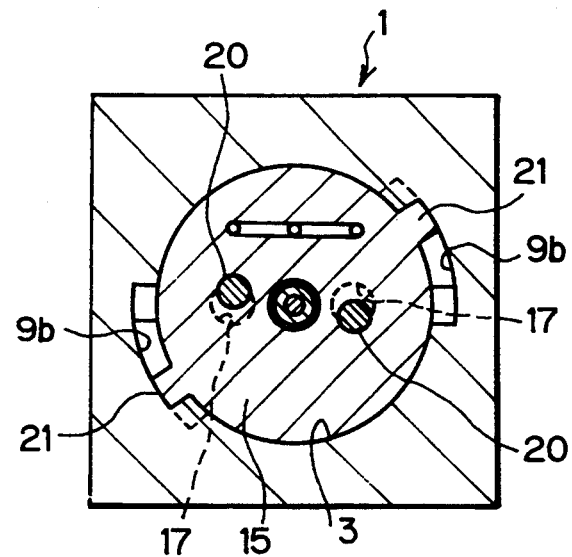
Figure 10C:
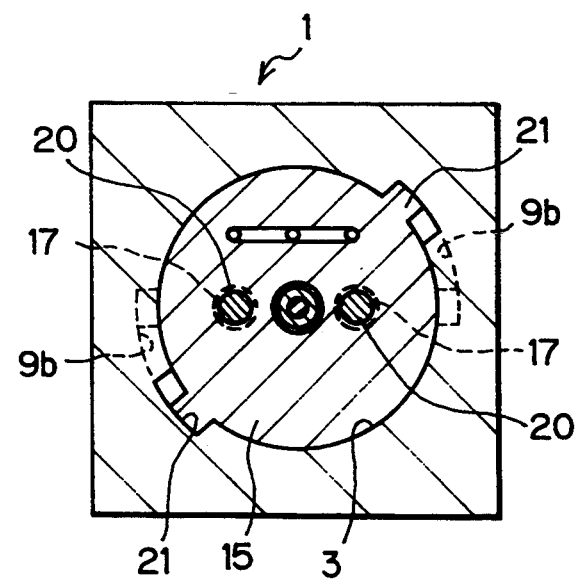

Next, an operation of coupling and detaching the connector mentioned above will be explained below by referring to FIGS. 10A to 10C.

Upon coupling the connector, the insertion side connector housing 2 is inserted into the cavity 3 in the stationary side connector housing 1 so that the ribs 21 of the movable member 15 into the straight face 9a of the guide grooves 9. Upon inserting the housing 2 into the housing 1, the intermediate electrodes 23 in the stationary plate 16 are arranged horizontally as shown in FIG. 1, the insertion side signal terminal 24 is arranged in an upper position as shown in FIG. 4, the lock pin 25 is arranged in a lower position and the ribs 21 and lock pieces 22 of the movable member 15 are disposed in a horizontal position shown by two-dot chain lines in FIG. 6.

When the ribs 21 reaches a proximal end of the straight face 9a of the guide groove 9 during insertion of the connector housing 2, the housing 2 cannot advance in the groove 9 straightly. This position is shown in FIG. 2. At this time, a distal end of the lock pin 25 is inserted into the hole 1c in the stationary side connector housing 1 to position the housing 1, thereby maintaining the stationary plate 16 (also, the body block 14) in the stationary position. Further, as shown in FIG. 10A, the movable electrodes 20 are greatly displaced from the insertion side electrodes 17 (intermediate electrodes 23).

The movable member 15 is turned in the clockwise direction so that the ribs 21 are guided in the rotary guide face 9b of the guide groove 9. When the movable member 15 rotates to a proximal end of the rotary guide face 9b, the movable electrodes 20 are displaced a little from the insertion side electrodes 17 and intermediate electrodes 23 as shown in FIG. 10B and the insertion side signal terminal 24 is spaced away from the stationary side signal terminal 7 since the insertion side connector housing 2 (stationary plate 16) does not contact with the bottom wall 1a of the cavity 3. At this time, the lock pieces 22 are still spaced apart slightly from the top end face of the stationary side connector housing 1 and spaced away circumferentially slightly from the engaging projections 10.

The movable member 15 is further turned in the clockwise direction from that position after pushing and inserting slightly the movable member 15 so that the ribs 21 are guided by the shoulder 9c of the guide groove 9. Thus, the lock pieces 22 abut on the top end face of the stationary side connector housing 1 and slide on the face to fit in the engaging projections 10. Consequently, the locking mechanism is brought into the coupling position to maintain the connector housings 1 and 2 in the coupling position.

At this time, as shown in FIG. 4, the insertion side connector housing 2 abuts on the bottom wall 1a, each boss 24a of the insertion side signal terminal 24 contact with each stationary side signal terminal 7, and the lock pin 25 completely fitting in the hole 1c. As shown in FIGS. 3 and 10C, the movable electrodes 20 rotates to a position between the insertion side electrodes 17 and the intermediate electrodes 23 to conduct them, and the intermediate electrodes 23 push the stationary side electrodes 4 against the spring 5, thereby bringing the electrodes 17 and 4 into a conductive state.

Thus, the battery is electrically connected to the charger to be charged. This charging can be carried out under a condition in which the stationary side signal terminals are brought into a conductive state through the insertion side signal terminal 24. Since, under the action of the spring 5, the stationary side electrodes 4 push the insertion side connector housing 2 toward the insertion side, the lock pieces 22 are engaged with the engaging projections 10 to maintain a locked position. When the lock pieces 22 are disengaged from the projections 10, that is, the locking mechanism is in a detaching position, the stationary side electrodes 4 under the action of the spring 5 push the insertion side connector housing 2 toward the insertion side, so that the insertion side signal terminal 24 is disconnected from the stationary side signal terminals 7.

On the other hand, in the case that the insertion side connector housing 2 is detached from the stationary side connector housing 1, the movable member 15 is turned in an anti-clockwise direction to draw the lock pieces 22 out of the engaging projections 10. Then, the locking mechanism is in the detaching position. The spring 5 pushes back the insertion side connector housing 2 so that the housing 2 is spaced away slightly from the bottom wall 1a. Consequently, the insertion side signal terminal 24 is spaced away from the stationary side signal terminals 7 and the electrodes 4 and 17 are brought into a non-conductive state. When the ribs 21 are turned reversely on the rotary guide face 9b of the guide groove 9 and then are moved back along the straight face 9a of the guide groove 9, the connector housing 2 can be detached from the connector housing 1 by drawing the movable member 15 on the body block 14 toward the insertion side.

According to the embodiment, only when both connector housing 1 and 2 are locked in the coupling position, are the electrodes 4 and 17 brought into a conductive state. When the housings 1 and 2 are in an incomplete coupling position, the electrodes 4 and 17 remain in a non-conductive state. Accordingly, in comparison with the conventional connector in which both electrodes are brought into a conductive state even if both connector housings are in an incomplete coupling position, both electrodes 4 and 17 in the connector of the present invention are positively brought into a conductive state in the coupling position of both connector housings 1 and 2 and both electrodes 4 and 17 are inhibited from conducting in the incomplete coupling position in which both connector housings 1 and 2 are easily detached from each other. Even if both connector housings 1 and 2 happen to be changed from an incomplete coupling position to a detaching position, it is possible to prevent the occurrence of an electrical failure such as an arc.

It should be noted that the present invention is not limited to the above embodiment and can be applied to other uses of connectors as well as to charging electric automobiles without departing from the spirit of the present invention.

What is claimed is:

1. A connector comprising a stationary housing, an insertion housing, and a rotatable housing
    said stationary housing containing at least one stationary electrode, said insertion housing containing at least one insertion electrode, and said rotatable housing containing at least one movable electrode, said movable electrode extending substantially parallel to an axis of said connector and being located between said insertion electrode and said stationary electrode, said insertion electrode and said stationary electrode being axially aligned with each other and axially separated by said movable electrode, said rotatable housing having a first position, wherein said movable electrode is out of electrical contact with said stationary electrode and/or said insertion electrode, and a second position, wherein said movable electrode is in electrical contact with said stationary electrode and said insertion electrode, a locking device for releasably coupling said insertion housing to said stationary housing.

2. The connector of claim 1 wherein there is a first plurality of each said electrode.

3. The connector of claim 1 wherein said stationary housing has an inner cavity for receiving said rotatable housing, an inner surface of said cavity having guide grooves extending from a front end face of said stationary housing into said cavity, said front end face having engaging projections thereon, said rotatable housing having ribs and locking pieces on its outer peripheral surface, said ribs being complementary to said guide grooves and said locking pieces engaging said engaging projections when said rotatable housing is in said second position.

4. The connector of claim 1 comprising a stationary plate on said insertion housing between said insertion housing and said stationary housing, said stationary plate containing at least one intermediate electrode and at least one signal terminal, said stationary housing containing at least one insertion terminal complementary to said signal terminal and in electrical contact therewith when said insertion housing is fully connected to said stationary housing and said rotatable housing is in said second position, thereby forming a signal circuit indicating that an electrical circuit from said insertion electrodes to said stationary electrodes is complete.

5. The connector of claim 1 wherein said insertion housing comprises a body block containing said insertion electrodes and said stationary plate is on said body block adjacent said stationary housing.

6. The connector of claim 1 wherein there is a first element urging said stationary electrode toward said insertion electrode and a second element urging said insertion electrode toward said stationary electrode.

7. The connector of claim 4 wherein there is a second plurality of each of said signal terminal and said insertion terminal.

8. The connector of claim 4 wherein there is said first plurality of each of said intermediate electrode.

* * * * *